Figure 1:
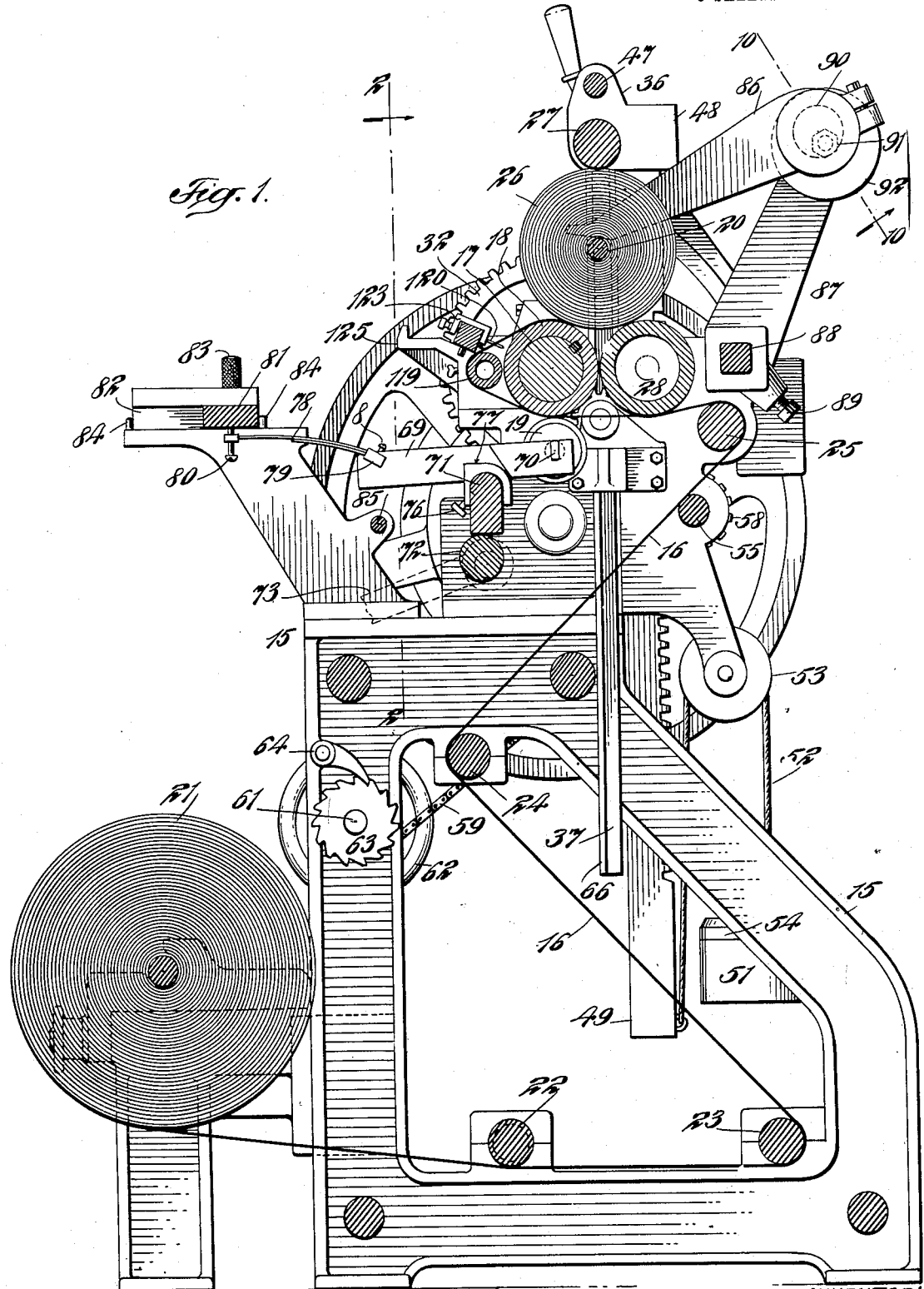

J. A. CAMERON & G. B. BIRCH.
SLITTING AND REWINDING MACHINE.
APPLICATION FILED JAN. 8, 1912.

1,076,189.

Patented Oct. 21, 1913.

5 SHEETS—SHEET 1.

J. A. CAMERON & G. B. BIRCH.
SLITTING AND REWINDING MACHINE.
APPLICATION FILED JAN. 8, 1912.
1,076,189.
Patented Oct. 21, 1913.
5 SHEETS—SHEET 2.
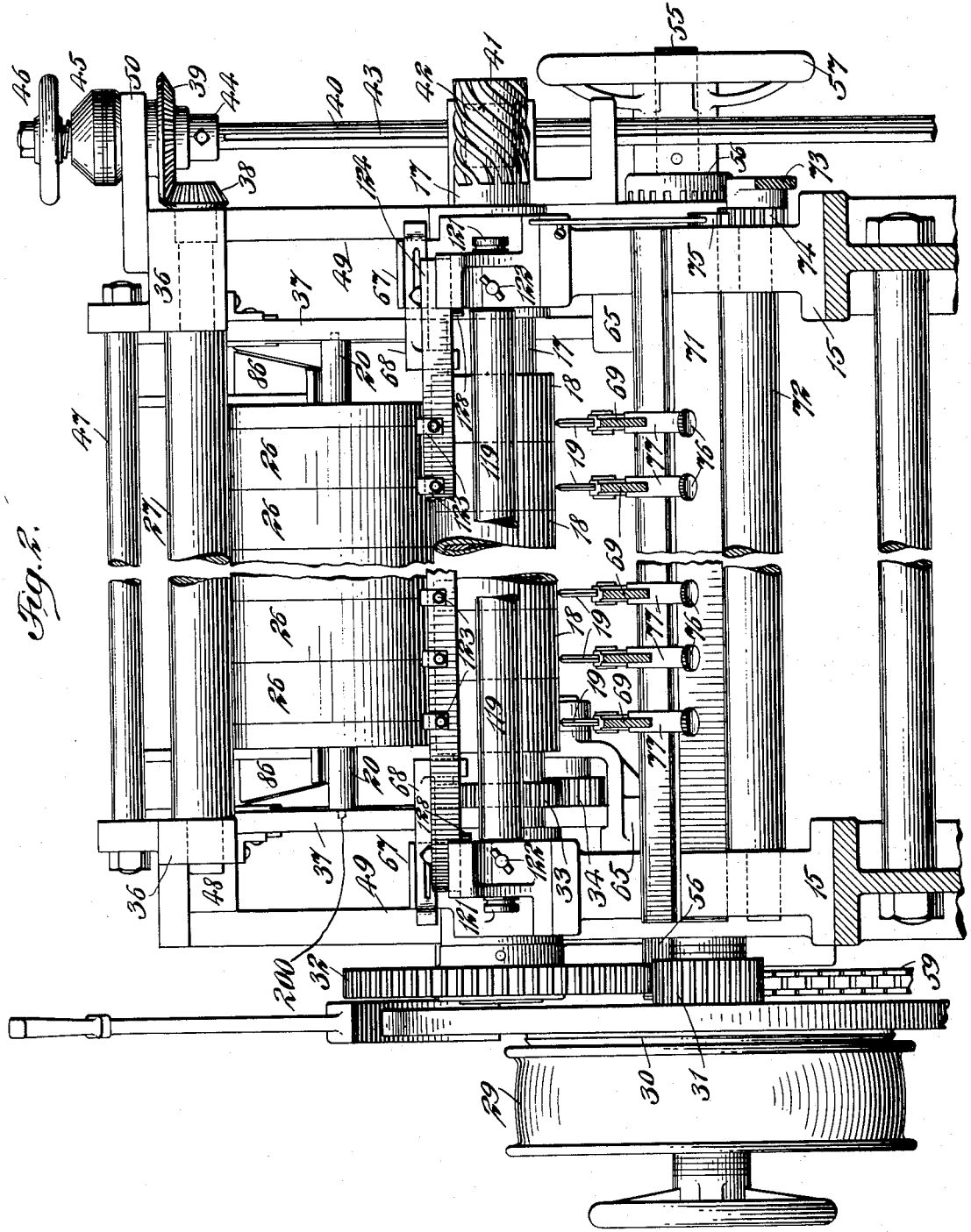

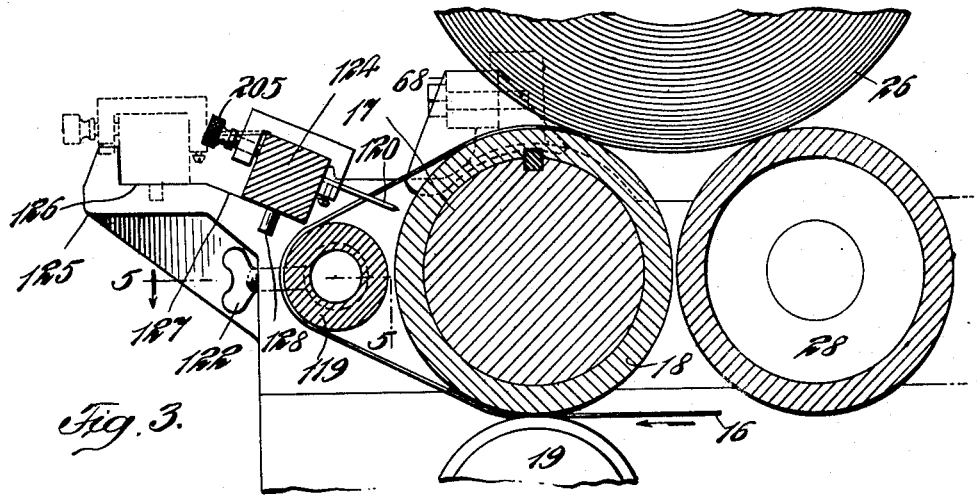
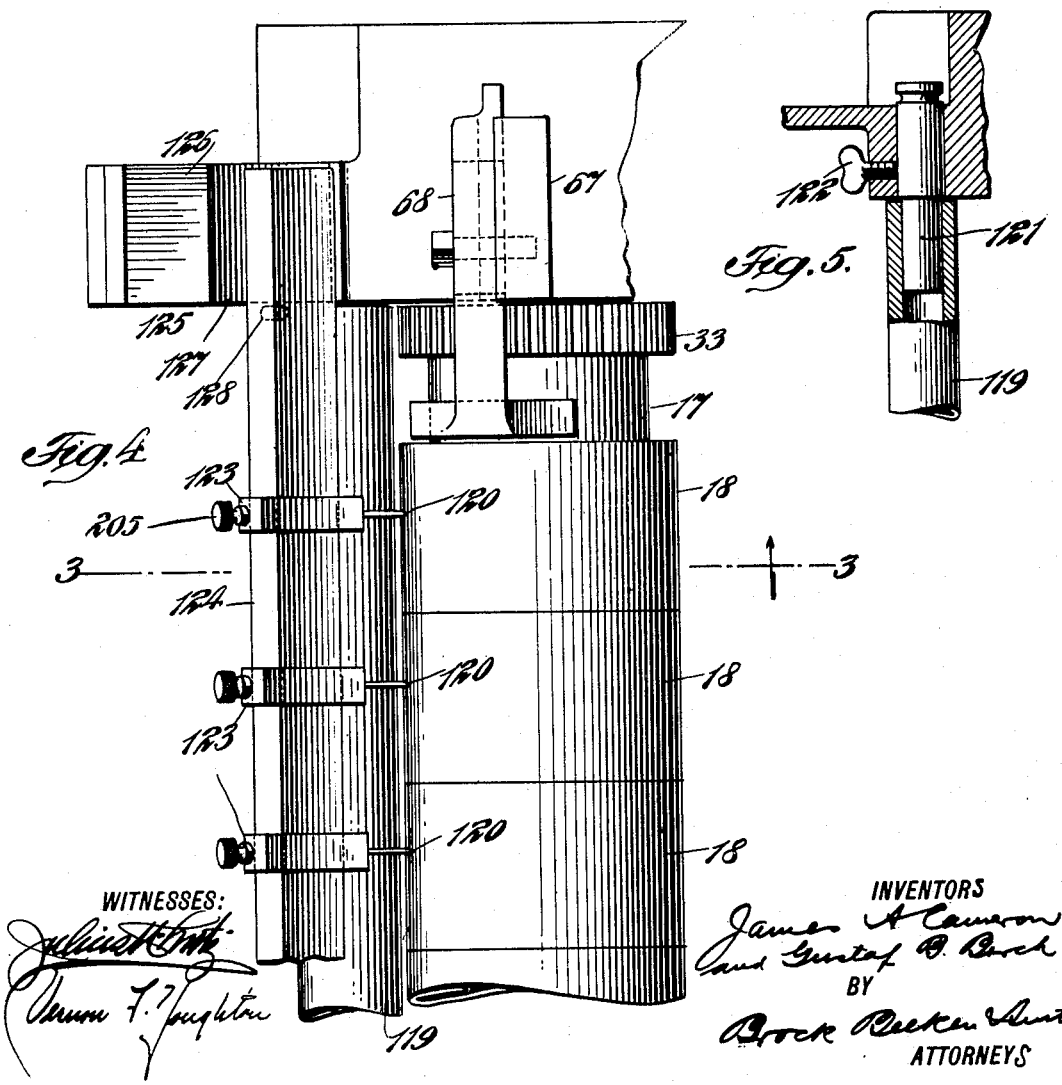

J. A. CAMERON & G. B. BIRCH.
SLITTING AND REWINDING MACHINE.
APPLICATION FILED JAN. 9, 1912.
1,076,189.
Patented Oct. 21, 1913.
5 SHEETS—SHEET 4.
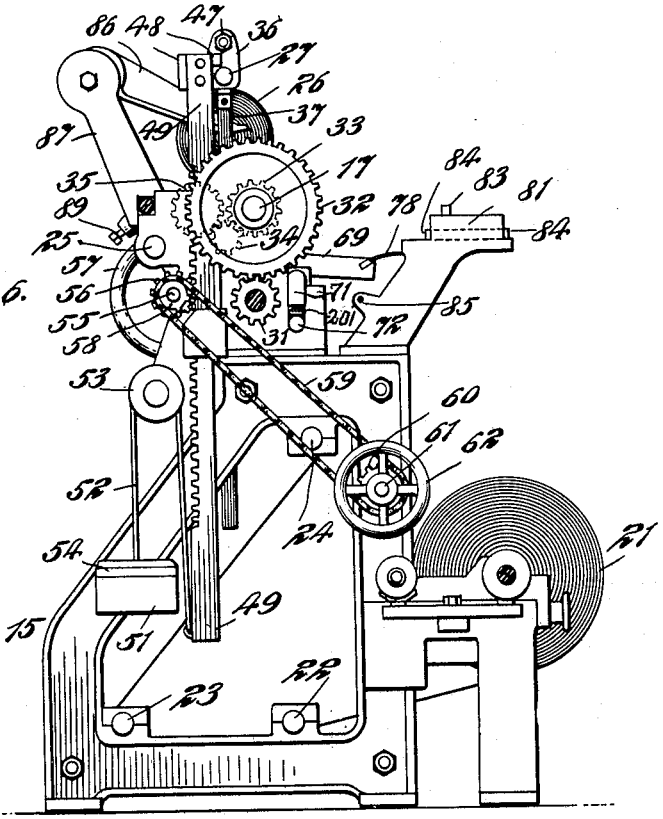
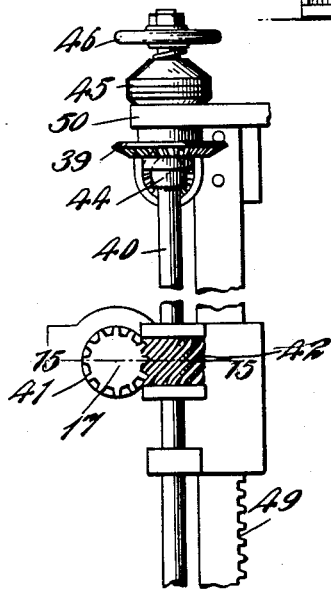
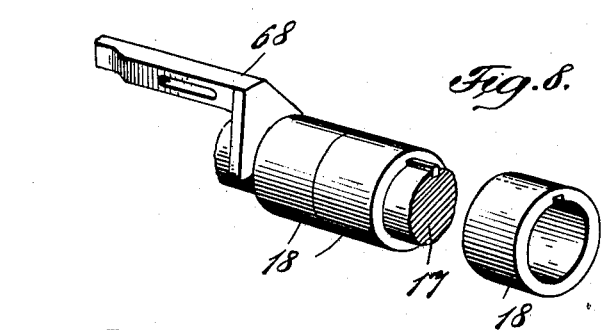
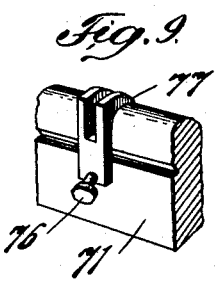
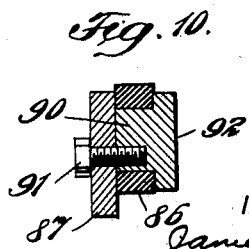
WITNESSES:
INVENTORS
James A Cameron
and Gustaf B. Birch
BY
Brock Becker Smith
ATTORNEYS J. A. CAMERON & G. B. BIRCH.
SLITTING AND REWINDING MACHINE.
APPLICATION FILED JAN. 8, 1912.
1,076,189.
Patented Oct. 21, 1913.
5 SHEETS—SHEET 5.
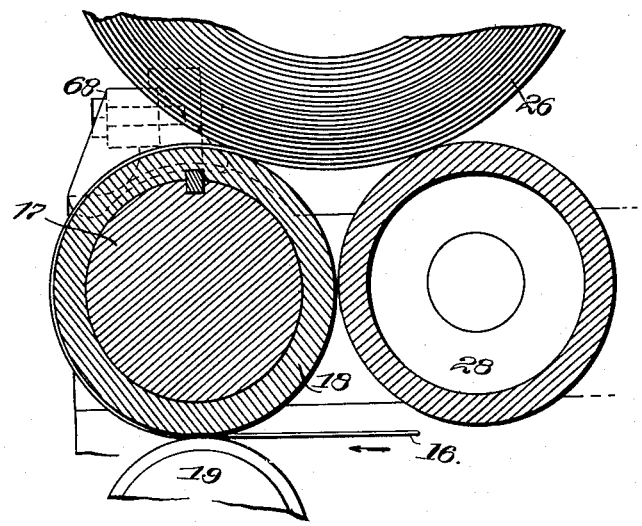
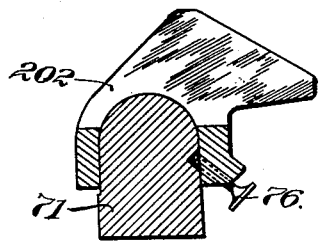
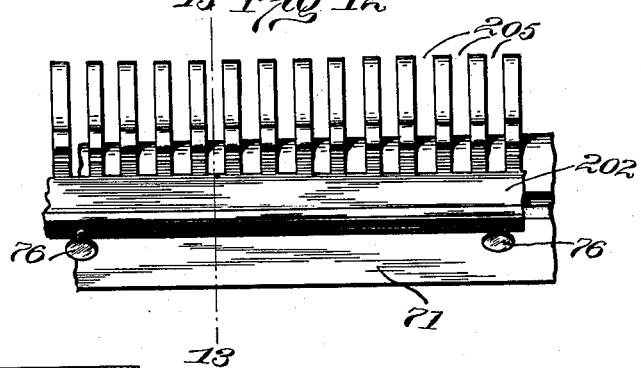
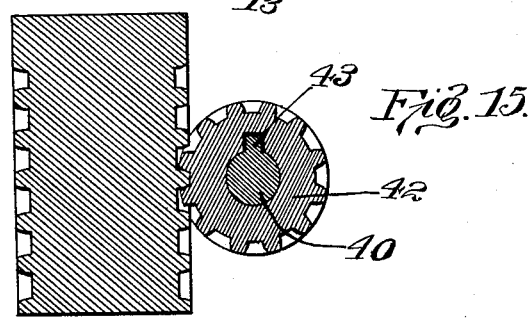
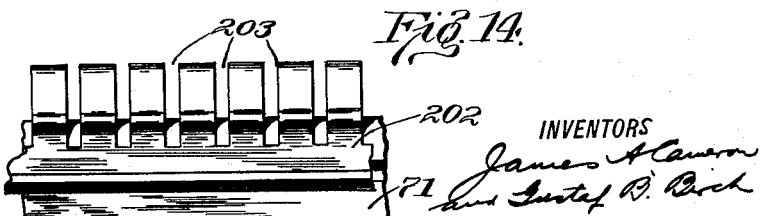
WITNESSES:
INVENTORS
James A Cameron
Gustaf B. Birch
BY
Brock Becker & Smith
ATTORNEYS

UNITED STATES PATENT OFFICE.

JAMES A. CAMERON AND GUSTAF BIRGER BIRCH, OF NEW YORK, N. Y., ASSIGNORS TO CAMERON MACHINE COMPANY, OF BROOKLYN, NEW YORK, A CORPORATION OF NEW YORK.

SLITTING AND REWINDING MACHINE.

1,076,189. Specification of Letters Patent. Patented Oct. 21, 1913.

Application filed January 8, 1912. Serial No. 670,007.

*To all whom it may concern:*

Be it known that we, JAMES A. CAMERON and GUSTAF B. BIRCH, both citizens of the United States, and residents of the borough of Brooklyn, in the county of Kings, city and State of New York, have invented certain new and useful Improvements in Slitting and Rewinding Machines, of which the following is a specification.

The present invention relates to slitting and rewinding machines used for the purpose of slitting a comparatively wide web of paper, cloth or like material into strips of various width, the machine delivering such strips in rewound form known as coils or rolls.

This application is a continuation in part of application Ser. No. 576,813, filed August 12, 1910.

In the prior art the problem of slitting the paper has always been considered as being distinct from the problem of rewinding it, and conversely, the problem of rewinding the slit sections has always been considered distinct from the problem of slitting it. In other words, it has not been realized that it is necessary to have a particular kind of rewinding device in order to effect a proper slitting of the material, nor has it been understood that in order to rewind the slit sections properly it is necessary to have a particular kind of slitting device. The two problems are inter-dependent and really constitute one unitary problem. Thus if rotary shears with overlapping edges are used for slitting the paper or other material, the shearing action necessarily displaces the edges of the material acted upon out of the plane of the web, and at the same time causes the slit sections to become displaced laterally with relation to each other. When it is attempted to rewind the slit sections which have been thus distorted, we have found that the rewinding device will operate inefficiently because in rewinding, the slit sections are apt to overlap and where this overlapping occurs, the coils produced will interweave, so that instead of being entirely separate coils, the material in the different coils will be intermeshed to such an extent as to render the slit product valueless. The foregoing will also result in building the coils much higher at the points where they interweave than at other points and will thereby throw the rewinding device out of proper operation. On the other hand, the rewinding device will, unless it is of a particular kind, distort and affect the operation of the slitting means. Thus, if the slit sections of the web are rewound into coils whose diameters are not uniform with respect to each other, the different coils will exert different tensions upon the web and will cause different surface speeds of the said web at the point where the material is being slit, and the rewinding means will thus have a tendency to distort the web with respect to the slitting means, thereby producing slit sections of non-uniform and irregular width.

We have found that only by combining a particular slitting device with a particular rewinding device can the proper result be obtained. For the slitting device we utilize a score cutter which consists of a plain surfaced roller coöperating with a rotary cutting disk. This device, unlike the overlapping shears, will not distort the web or the slit sections thereof, and will thus permit the said sections to be rewound without overlapping or interweaving. As a rewinder we utilize a device which will exert an equal pull across the full width of the web so as not to distort the slit sections or the unsevered web with respect to the slitting device. This is effected by rewinding the slit sections by means of rolls which engage the surface of all the coils being rewound and by having pressure exerting means which will exert a uniform tension on all the coils and keep them of uniform diameter with respect to each other. We have further found that the unitary object of slitting and rewinding paper can best be obtained by utilizing a roll, against which the cutting disks act in severing the web, which has a surface capable of resisting the cutting action of the disks, since otherwise the said disks would eventually produce grooves in the roll and would thus distort the web and prevent it from being properly rewound. In the preferred form we utilize a roll which has a surface that is hardened to as high a degree as possible, namely, a degree of hardness commonly known as "glass-hard." In connection with this roller we employ disks that are blunt, relatively speaking, and which are of a material less hard than the surface of the roll against which they act. It is important in this connection that the hard roller should do the propelling of the web and that the cutting disks should not be positively driven since should there be any variation in the diameter of the cutting disks, they would tend to pull unequally on the web and would thus cause it to be distorted. In the present instance the disks are driven by frictional engagement with a hardened roller, and the diameter of such disks is therefore immaterial, since they perform no function in propelling the web.

Stated broadly our invention consists in severing the web of material into strips without distorting the strips or the cut edges of the strips out of the plane of the web, and in then rewinding the strips into coils by means which will exert a constant even pull across the full width of the web, whereby the rewinding means thus exerting an equal pull on the web at all points laterally thereof, will advance the web without distorting it at the point of severance.

In the preferred embodiment of our invention we use cutter disks which coöperate with a smooth-surfaced cutter roll to sever the web into strips without distorting the strips out of the plane of the web or to any appreciable extent laterally with respect to each other, and in connection with this particular form of cutter mechanism we employ a surface rewinding device which will pull the web with substantially equal tension at all points laterally thereof. And we have overcome the objections to the old style of score cutter recited above (in which the cutters gradually cut grooves in the cutter roll) by making the cutter roll of relatively harder material than the cutter disks, so that the cutter roll will resist and prevent the cutting disks from cutting into the surface thereof. We have carried out this idea of making the cutter roll impregnable to the action of the cutting disks even further by making the cutting disks with a slightly blunt edge instead of the sharp keen edge heretofore employed. We are able to do this and to still get a sharp clean cut by reason of the fact that the cutter roll is given a glass-hard smooth cutting surface.

Varoius other minor features of the invention will be understood and appreciated as the specification proceeds.

In the accompanying drawings we have illustrated in a concrete form a preferred embodiment of our invention, but at the same time we would have it understood that it is susceptible of various changes and modifications without departing from the spirit and scope of the invention.

In the drawings: Figure 1 is a vertical sectional view taken on a transverse plane through a machine embodying our invention. Fig. 2 is a front elevation, partly broken away and partly in section, of the upper portion of the machine, taken on the line 2—2 of Fig. 1. Fig. 3 is a broken sectional view on an enlarged scale to more clearly illustrate the cutting and rewinding mechanism, this view being taken on the line 3—3 of Fig. 4. Fig. 4 is a more or less detached plan view of that portion of the machine shown in Fig. 3. Fig. 5 is a broken detail view illustrating the mounting of one of the rolls, this being the smaller one shown at the left in Figs. 3 and 4. Fig. 6 is an end view of the machine with parts in section, the belt wheel and clutch being omitted. Fig. 7 is a detached and more or less broken detail view of certain of the gearing mechanism shown at the right in Fig. 2. Fig. 8 is a detached perspective view of a portion of the pressure or cutter roll and of one of the separate tubular surface sections which go to make up the cutting surface of the roll. Fig. 9 is a detached perspective view of one of the single adjustable bearings for the cutters, showing a section of the supporting rail on which it is mounted. Fig. 10 is a sectional view illustrating a form of mounting for the coil-end guides, the view being taken on the line 10—10 of Fig. 1. Fig. 11 is a detail sectional view of the simpler and preferred form of the invention showing portions of the cutting and rewinding mechanism. Fig. 12 is a detail view illustrating a form of "gang-spacer" for simultaneously spacing a plurality of the cutters. Fig. 13 is a cross-sectional view of the same, taken on the line 13—13 of Fig. 12. Fig. 14 is a view like Fig. 12, only on a smaller scale, showing a substitute gang-spacer for spacing the cutters for different widths of cut. Fig. 15 is a detail sectional view of a portion of the gearing mechanism shown in Fig. 7, the view being taken substantially on the line 16—16 of Fig. 7.

Like reference characters refer to corresponding parts throughout the different views.

Proceeding first to a consideration of the cutter mechanism; the same consists in a preferred form of one or a number of cutter disks 19 which are mounted to coöperate with a cutter roll 18. The cutter roll has a smooth hardened exterior cutting surface which is enough harder than the cutting disks to resist the cutting effect of the cutters and prevent the cutters from cutting into the surface of the roll. For this purpose the surface of the cutter roll is preferably made with a "glass-hard" finish and the cutting disks are preferably made of a quality of steel that admits of the maximum of hardness without brittleness. These cutting disks acting in this way against the smooth hard-faced backing or cutter roll serve to cut the web of material 16 into strips of the desired width. The cutting edge of the disks need not be acutely sharp for a "knife edge" would be liable to be turned over or flattened upon working in contact with the hard-surfaced cutter roll, and for this reason the cutting edge is preferably made slightly blunt.

As we have so far found it impracticable to secure an even hard temper throughout the whole surface of a cutter roll when the same is made in a single piece, we prefer to make the cutter roll of a series of tubular surface sections, best indicated at 18 in Fig. 8, which may be separately tempered to the desired degree of hardness, and which are all keyed or otherwise engaged with a core shaft 17.

The web of material is, as best shown in Fig. 1, led from the web roll 21 over suitable guiding and smoothing rolls 22, 23, 24 and 25 to the cutter roll, the web as it passes between the cutter roll and cutting disks, being at this point, divided into strips and the strips then passing on up around the cutter roll to the upper side thereof where the strips are wound into coils 26. (See Figs. 1 and 11.)

The rewinding mechanism, as best shown in Figs. 1, 3 and 11, preferably consists of a pair of feed rolls upon which the coils rest and bear upon with their under surfaces, and a pressure roll 27 which rides upon the upper surface of the coils to hold them in smooth uniform contact with the feed rolls. 28 designates one of these so-called feed rolls and the other feed roll may be and preferably is the cutter roll itself. Both these rolls are spaced quite close together and rotate in the same direction (toward the right in Fig. 1) so that the coils resting upon them will be wound compactly and evenly thereby. The coils 26 are all preferably wound upon the same arbor 20, but this arbor may, if desired, be made in sections or may carry spools for the actual reception of the coils.

The pressure roll 27 is preferably a driven roll so that it will not only hold the coils in firm contact with the feed rolls but will also assist materially in the winding of the coils. This pressure roll is mounted in bearings 36 (Fig. 2) in a vertically movable frame consisting of the side members 37 and the rack bars 49 which are all united at the top by a suitable cross stay 47 and cross-connections 48. The side members 37 are guided for vertical movement in the brackets 65, 68, and the rack bars slide in suitable vertical guides. Motion is conveyed to the pressure roll by suitable means, such as the spiral gears 41 and 42, shaft 40 and bevel gears 39—38. The upper end of the shaft 40 is supported in a suitable bearing 50 carried by the vertically movable frame. The gear 41 is the driving gear. The spiral gear 42 makes sliding engagement with the shaft 40 so as to allow for the rising and falling movement of the vertically movable frame which carries the pressure roll, and the gear 41 which drives gear 42, shaft 40 etc. is carried by one of the operating parts of the machine, such as the cutter roll shaft 17, as shown in Fig. 7. The necessary sliding driving engagement between the spiral gear 42 and the shaft 40 may be had by providing the shaft with a longitudinal rib or feather 43 which, as shown in Fig. 15, engages with a corresponding groove or keyway in the gear 42.

For the purpose of more firmly and positively coiling the strips, it has been found desirable to rotate the feed roll 28 at a slightly greater rate of speed than the cutter roll, which, in a way, is itself a feed roll. Also, better results are sometimes obtained by rotating the pressure roll 27 at somewhat greater surface speed than either the feed roll or the cutter roll. In order to thus rotate the pressure roll at higher surface speed and to permit of adjustment of the speed to suit different conditions, the gearing for operating the pressure roll is preferably such as to nominally rotate the pressure roll at a greater surface speed than the other rolls and a slip connection or like device is interposed in the line of gearing to permit the actual speed of the pressure roll to be adjusted at will. In the embodiment shown this adjustment is secured by means of a clamp 45 and a handwheel 46, the turning of this hand-wheel acting upon the clamp to hold the driving bevel gear 39 with greater or less friction against the collar 44 rigid on the shaft 40. The shaft 40 is thus through the spiral gears given a constant rotation and the speed of the pressure roll 27 may be controlled by allowing for more or less slippage between the shaft 40 and the bevel gear 39, which drives the pressure roll.

Power may be applied to operate the machine by a pulley 29 which is coupled to the pinion 31 by means of a clutch 30, the pinion 31 meshing with a gear wheel 32 secured upon the cutter roll shaft 17. Motion may be conveyed from the cutter roll shaft to the feed roll by means of a pinion 33 on the cutter roll shaft meshing with an idler 34 (Figs. 2 and 6) which in turn engages with a gear 35 on the shaft end of feed roll 28. The cutter roll and feed roll thus rotate in the same direction and the gearing is preferably so proportioned that the feed roll will rotate at a slightly greater surface speed than the cutter roll.

The amount of pressure with which the pressure roll bears upon the coils 26 may be adjusted and regulated to suit different requirements. A simple way of doing this is to connect counterweights 51 to the lower ends of the rack bars 49 by flexible connection 52 passing over pulleys 53. By increasing or diminishing the counterweight, as by adding or subtracting additional weights 54, the pressure upon the coils may be regulated to a nicety.

As it is necessary in starting the machine, and at other times, to elevate the pressure roll out of the way, we provide means for accomplishing this purpose, such as the pinions 56 on shaft 55. These pinions mesh with the rack bars so that as they are rotated by hand-wheel 62, the whole frame and the pressure roll carried thereby will be elevated. The hand-wheel 62 is mounted on a suitable journal 61 and is connected with shaft 55, as by means of sprocket chain 59 and the sprocket gears 60 and 58. To prevent backward rotation of the hand-wheel when lifting the pressure roll, there may be provided a ratchet wheel 63 (Fig. 1) on the opposite end of the journal 61, which ratchet wheel is engaged by the pawl 64. Aside from their prime function of lifting the pressure roll frame, the pinions 56 in thus meshing with the two rack bars, serve as a means of connection between the two rack bars to cause them to always move in parallelism.

The arbor shaft 20 on which the coils are wound is preferably unsupported at its ends, so as to revolve freely under the rotating influence of the feed and cutter rolls. The upward movement of the arbor, due to the increasing diameter of the coils, may, however, be guided somewhat by the reduced ends 200 of the arbor coming into engagement with the flanges 66 of the side members 37 of the vertically movable frame, as indicated in Figs. 1 and 2.

The cutter disks may be mounted in any suitable way. In the preferred form, however, they are, as shown in Fig. 1, mounted on journals 70 carried in the forward bifurcated ends of the bars 69, and the bars 69 are preferably supported on a rail or bar 71 which, as indicated in Figs. 1 and 9, has a rounded crown to permit the disk-carrying-bars to rock thereon. This supporting rail 71 is preferably mounted in guides 201 in the ends of the machine (Fig. 6) so that it may be raised and lowered to throw the cutters into and out of operation. The means for raising and lowering the cutters may vary, but in the construction illustrated the same consists of an eccentric shaft 72 which as it is turned by means of a handle 73 (Fig. 1) causes the cutters to be brought into engagement with the cutter roll or to be lowered away from contact with the same. The cutters are preferably forced against the cutter roll with a somewhat yielding pressure and this may be provided for by means of a leaf-spring 78 engaged in a pocket 79 in the end of each disk-carrying-bar and secured therein by a screw or like fastening device 8, the other end of the leaf-spring carrying an abutment such as the adjustable screw 80 for engagement with the under side of a hold-down bar 81. A stop rod 85 may be provided for the rear end of the disk-carrying or so-called cutter-bars to rest upon when the supporting rail has been lowered to disengage the cutters from the cutter roll.

In order to give ready access to any of the cutters, the hold-down bar 81 is preferably mounted in horizontal guide-ways 82 so that it may be slid rearwardly out of the way to thereby permit inspection or removal of any of the cutters when so desired. The bar 81 may be provided with handles for the convenient manipulation of the same and the stops 84 may be located at opposite ends of the guides 82 to limit the movement of the bar in either direction.

For the purpose of guiding the cutters and holding them in steady engagement with the cutter roll, we have provided so-called "guiding members" which are engaged upon the supporting rail and receive the disk-carrying-bars so as to guide and position the same. A separate guiding member may be provided for each cutter bar, but a special feature of our invention consists in the provision of a so-called "gang-spacer" which will receive a plurality of the cutter bars and will thus serve to position a plurality of cutters at once. One of the co-called "single" guides is shown at 77 in Figs. 1 and 9, the same consisting of a member which is recessed to fit over the top of the supporting rail, and is provided with a pocket to receive one of the cutter bars. The walls of this pocket are substantially parallel and preferably extend above the top of the supporting rail and also somewhat to the rear of the supporting rail (Fig. 1) so as to guide the rocking movement of the cutter bar on the supporting rail and prevent any lateral twisting of the same. Means such as a screw 76 is provided for securing the guide in any adjusted position upon the supporting rail.

In a machine where the width of the strips to be cut must vary a great deal, the single guides for the cutter bars will preferably be found most useful, but where the machine is called upon to cut certain so-called standard widths, we find it advantageous to use the "gang-spacer," the same consisting of a guiding member 202 which, as shown in Figs. 12, 13 and 14, has a plurality of pockets 203 therein to receive a plurality of the cutter bars and thereby simultaneously position a series of the cutters. The spacing of these pockets in the guiding members will of course vary to suit different requirements. Thus, in Fig. 12, there is shown a gang-spacer for use when cutting narrow widths of material, while the gang-spacer illustrated in Fig. 14 is used when cutting somewhat wider strips of material. The spacing of the guiding pockets in the gang-spacers may be uniform, as illustrated in the drawings, or it may be more or less irregular, according to different requirements. The walls of the pockets in these gang-spacers are, like those in the single guide, preferably extended up above the top of the guide rail and also rearwardly away from the guide rail so as to firmly guide the cutter bars to prevent any lateral swaying or twisting of the same.

When spacing the cutters to cut different widths, it is obviously desirable that the joints between the different tubular surface sections of the cutter roll shall not come in line with any of the cutters. To guard against such a happening, means are preferably provided whereby the surface sections of the cutter roll may be shifted longitudinally of the roll to carry the surface joints of the roll out of line with the cutters. This means may take the form of an adjustable bracket 68, shown in Figs. 3, 4 and 8, which is adjustably secured upon a guide 67. It will be seen that by adjusting this bracket the tubular surface sections of the cutter roll may be shifted lengthwise of the roll to any desired extent.

In cutting most fabrics, such as paper and the like, the cutters are able to sever the web with clean cut edges, but in cutting some grades of cloth it is extremely difficult to entirely sever all of the fibers of the material. We find also that in cutting cloth and like material, the cut strips are liable to "slide" laterally somewhat on the polished surface of the cutter roll. We have anticipated these two liabilities by providing guides for directing and positioning the cut strips on their way to the rewinding coils. These separators are shown in Figs. 1, 3 and 4 as fingers 120 which are projected in between the cut strips of the material, the fingers being carried in suitable brackets 123 which are preferably adjustable for different widths of material by being slidingly engaged on a support 124 and secured thereon by some securing means, such as the screws 205. These guiding fingers perform the double function of guiding the cut strips in a direct line of their respective coils and at the same time of cleaning the edges of any loose fibers which may not be wholly severed. To allow for the use of these guiding fingers the strips of material have to be deflected somewhat out of their circumferential course around the cutter roll, and for this purpose we provide a guiding roll 119 around which the strips pass directly after leaving the cutters. As this guiding roll is usually not needed and is only employed when cutting special fabrics, it is preferably made easily removable. To this end a mounting, such as illustrated in Fig. 5, may be employed for the roll, this mounting consisting of removable pintles 121 which may be inserted through suitable openings in the end frames of the machine to engage seats in the ends of the guiding roll. These removable pintles may be secured in position by suitable means, such as the fastening screws 122. The guide fingers 120 are also preferably mounted in such a way that they may be shifted out of operative position. For this purpose the supporting bar 124 which carries the fingers may rest upon inclined ways 127 when in use, so that when not in use it may be shifted up these inclined ways onto horizontal ways 126 on the end brackets 125 of the machine. The supporting bar 124 is held against longitudinal movement by suitable devices such as the abutment pins 128.

The roll made up of the coils of cut strips has a tendency at times to become irregular or bulge outwardly at its ends and to prevent such a result we preferably provide confining means for engaging the ends of the roll. These confining means in the present instance are in the form of arms 86 which may rest at their forward ends upon the arbor 20 and which are preferably supported at their upper ends in such a way as to be capable of a certain adjustment. In the present instance this adjustment is accomplished by pivoting the upper ends of the arms 86 on the eccentrics 90 carried by the disks 92, which disks are, by suitable securing means such as screws 91, secured upon the upper ends of the brackets 87. By loosening screws 91 (Figs. 1 and 10) and turning the disks 92, it will be obvious that the eccentrics will be rotated to move the pivotal center of the roll confining arms 86 either forwardly or rearwardly. In order to suit different lengths of rolls, the roll confining arms are rendered adjustable by mounting the brackets 87 on a longitudinal rod 88, the brackets being secured upon the same in adjusted position by suitable means such as nuts 89.

From the foregoing it will be evident that as the web of material reaches the plane of contact between the cutter roll and cutter disks, it will be severed into strips of the desired width and without distorting the strips out of the plane of severance or laterally with respect to each other; that the strips by reason of this non-distorting action of the cutters will then pass on to the rewinding mechanism in true side by side relation without any overlapping or interweaving; that the rewinding mechanism thus receiving the cut strips in true side by side relation will rewind them into coils of uniform diameter; and that the rewinding mechanism acting on these coils of uniform diameter will serve to exert a uniform tension or pull upon the strips and thus upon the web at all points laterally thereof, whereby the pull upon the web at the plane of severance will be equal at all points so that no distortion of any sort will occur.

As explained above, it is only necessary to use the separators 120 when working upon certain grades of material and consequently for a machine which is to be used only for one certain kind of material, such as paper, it is not necessary to make provision for these guide fingers at all. Thus in the machine illustrated in Fig. 11 which is designed to operate on only a certain kind of material, such as paper, the guiding and separating fingers 120 are not needed, nor does any provision have to be made for supporting these fingers.

We would direct particular attention to the importance of the pressure roll 27. This roll bears upon the full length of the coils, keeping them all of the same uniform diameter and bearing upon each coil with equal pressure. The pressure roll thus insures an equal pull upon each of the coils and hence an equal tension across the full width of the web. In order that the pressure roll may bear upon all the coils with an equal pressure, it is evident that the side members of the frame in which the pressure roll is mounted must move upward in absolute parallelism, for if this were not so, one end of the pressure roll might rise higher than the other end and thus bear with less pressure upon the coils at that end. In the older forms of slitting machines where a riding roll was employed together with a shaft drive for operating the roll from the gearing of the machine, certain difficulties were encountered which produced inequality in the pressure of the riding roll. This point will be best understood from a consideration of Figs. 7 and 15. In these older machines it was customary to provide a slip connection between the vertically movable shaft 40 and the gear for driving the same by slotting both the shaft and its driving gear longitudinally and then inserting a loose key in the alining slots so formed. In this arrangement the difficulty consisted in the fact that as the driving gear rotated, it would tend to twist the outer edge of the loose key in one direction and the inertia of the shaft would tend to twist the inner end of the loose key in the opposite direction. The key was thus given a longitudinal twist which would cause the same to bind more or less in its key-way and thus prevent the shaft from sliding freely through its driving gear. This binding action of the key would as a matter of fact have to retard the lifting movement of the riding roll at the driven end of the roll, and the roll instead of moving steadily upward according to the increasing diameter of the coils, will be moved upward in a series of jerks. While the driving end of the riding roll was thus retarded, the opposite end of the riding roll would be free to rise with the increasing diameter of the coils at that end and hence the roll would bear with unequal pressure upon the coils at different ends of the roll. This would naturally produce a distortion of the coils, and this distortion in the coils would transmit an unequal pull to the web and hence a distortion of the web at the plane of severance. This difficulty has been overcome in our present machine by making the key 43 on the drive shaft 40 rigid with the shaft. Thus from the construction shown in Fig. 15, it will be evident that the shaft 40 will be free to slide through its driving gear 42 at the same time that it is being rotated by such gear. The pressure roll will thus be free to rise evenly at both ends so that it will maintain a constant even pressure on all the coils.

What is claimed, is:

1. A machine for slitting a web of material into strips and winding the strips into coils of uniform diameter, comprising, means for slitting the web into strips without distorting the strips from the plane of the web, and rewinding means exerting a uniform pull on the surface of all the individual coils to produce an equal pull on the web at all points laterally thereof at the plane of severance.

2. In a slitting and rewinding machine, means for severing a web of material into strips without distorting the strips out of the plane of the web, and means for rewinding the cut strips into coils of uniform diameter comprising rewinding rolls exerting a uniform driving pressure on the surface of all the coils to produce an equal pull at all lateral points on the web at the plane of its severance.

3. In a slitting and rewinding machine, means for slitting a web without distorting the slitted sections out of the plane of the web at the point of severance or laterally with relation to each other, means for rewinding the slitted sections into a plurality of coils of uniform diameter, said means consisting of a support and a plurality of rolls exerting a uniform driving pressure on the surface of all the coils so as to produce an equal pull on the web at all points laterally to prevent distortion thereof at the point of slitting.

4. A slitting and rewinding machine comprising in combination, cutting disks coöperating with a smooth-surfaced cutter roll for cutting a web into strips without distorting the strips out of the plane of severance or laterally with respect to each other, and means for rewinding the cut strips into coils of uniform diameter, consisting of an arbor on which the coils are mounted and rewinding rolls engaging with the surface of all the coils so as to exert an even pull thereon at all points laterally thereof at the plane of severance.

5. In a slitting and rewinding machine, the combination of cutting disks, a cutter roll with which the cutting disks coöperate to cut the web into strips, the said cutter roll having a surface of such hardness that it will not be cut into by the cutting disks, whereby the roll will always present a true smooth surface, and means for winding the cut strips into coils of uniform diameter, comprising a rewinding roll rotating in the same direction with the cutter roll and coöperating with the cutter roll to engage with the under surface of the coils resting thereon, and a pressure roll resting on the upper surface of the coils to hold them all in engagement with the cutter and rewinding rolls with equal pressure, whereby the pull on the web at the plane of severance will be equal at all points laterally thereof.

6. In a slitting and rewinding machine, the combination of cutting disks, a cutter roll with which the cutting disks coöperate to cut the web into strips, the said cutter roll having a surface of such hardness that it will not be cut into by the cutting disks, whereby the roll will always present a true smooth surface, and means for winding the cut strips into coils of uniform diameter, comprising a rewinding roll rotating in the same direction with the cutter roll and at a slightly higher speed and coöperating with the cutter roll to engage with the under surface of the coils resting thereon, and a pressure roll resting on the upper surface of the coils to hold them all in engagement with the cutter and rewinding rolls with equal pressure, whereby the pull on the web at the plane of severance will be equal at all points laterally thereof.

7. In a slitting and rewinding machine, two rewinding rolls, driven in the same direction, and engaging with the underside of the surface of the coils being rewound, a driven pressure roll resting on the upper side of the surface of the coils being rewound and exerting a uniform pressure on all the coils, means for permitting said pressure roll to rise as the diameter of the coils increases, a rotatable cutter engaging with one of the rewinding rolls, said cutter having a relatively blunt cutting edge, and said rewinding roll having a surface of sufficient hardness to resist being cut into by the cutter.

8. The combination in a slitting and rewinding machine, of cutting disks for slitting a web of material into strips, a cutter roll with which the cutting disks coöperate, the said roll having a cutting surface harder than the cutting disks to such an extent that the cutting disks will be unable to cut into the surface of the cutter roll, and means for rewinding the cut strips into coils of uniform diameter comprising an arbor on which the coils are mounted, a rewinding roll rotating in the same direction with and coöperating with the cutter roll to engage with the underside of the coils resting thereon, a pressure roll riding on top of the coils and pressing them against the cutter and rewinding rolls with a uniform pressure whereby an even pull across the full width of the web will be produced, thereby preventing distortion of the web at the point of severance.

9. A machine for slitting a web of material into strips and rewinding the strips into circular coils of uniform diameter, comprising means for slitting the web into strips without distorting the same from the plane of the web consisting of a plain surfaced roller coöperating with a rotary cutting disk, and rewinding means exerting a uniform pull on the surface of all the individual coils to produce an equal pull on the web at all points laterally thereof at the plane of severance, consisting of rolls engaging all the coils at a plurality of points to wind the coils in true circular shape and a pressure exerting roller exerting a uniform tension on all the coils to keep them of uniform diameter.

10. A machine for slitting a web of material into strips and rewinding the strips into circular coils of uniform diameter comprising a spindle for the coils, two rewinding rolls engaging all the coils at a plurality of points to insure true circular shape of the coils, a pressure exerting roller exerting a uniform tension on all the coils to keep them of uniform diameter, and thus exerting an equal pull across the full width of the web at the plane of severance, and a rotary cutting disk adapted to engage with a smooth-faced portion of one of the rewinding rolls to sever the web without distortion of the slit sections from the plane of the web.

11. In a machine for slitting fabrics, a cutter roll, cutter disks coöperating with the cutter roll, a feed roller parallel to the cutter roll, a vertically movable mandrel arranged to move in a plane between the cutter roll and feed roller and to receive the cut strips and wind them into rolls resting on the cutter roll and feed roller, and confining means engaging the ends of the roll of the strip-rolls to maintain the ends of such roll uniform.

12. In a machine for slitting fabrics, a cutter roll, cutter disks coöperating with said cutter roll, a feed roller parallel to the cutter roll, a vertically movable mandrel arranged to move in a plane between the cutter roll and the feed roller and to have the cut strips wound thereon into rolls resting upon the cutter roll and feed roller, means coöperating with the cutter roll and feed roller for rotating and thereby winding the strip-rolls, and confining means for engaging with the ends of the roll of strip-rolls to maintain uniformity in the winding of the same.

13. In a machine for slitting fabrics, a cutter roll, a roller parallel therewith, a vertically movable mandrel in a plane between said roll and roller to receive the cut strips and wind them into rolls resting on said cutter roll and said roller, a driven roller above the rolls of strips and coöperating with said cutter roll and parallel roller for rotating the strip-rolls to wind the strips, a vertically movable frame for carrying said driven roller, rack bars suspended from said frame, and gear wheels in mesh with said rack bars whereby to maintain uniform vertical movement of the said frame.

14. In a machine for slitting traveling fabrics, a rotary cutter-roll comprising a shaft having thereon a series of end to end smooth surfaced cylindrical hardened metal cutter-sections, a series of rotary cutter-disks for coöperation with said sections, means for positively pressing all said disks against the smooth surfaces of said sections with a yielding force independently inherent to each disk, and means for drawing the fabric between said cutter-roll and said disks.

15. In a machine for slitting traveling fabrics a rotary cutter-roll comprising a shaft having thereon a series of end to end smooth surfaced cylindrical hardened metal cutter-sections, a series of rotary cutter-disks for coöperation with said sections, and means for drawing the fabric between said cutter-roll and said disks, combined with adjustable means adjacent to the ends of said shaft for adjusting said sections on said shaft so as to locate the joints between the said sections from alinement with said disks.

16. In a machine for slitting traveling fabrics, a rotary cutter-roll comprising a shaft having thereon a series of end to end smooth surfaced cylindrical hardened metal cutter-sections, a series of rotary cutter-disks for coöperation with said sections, and means for drawing the fabric between said cutter-roll and said disks, combined with means for positively moving all said disks simultaneously against said cutter roll with an independent yielding pressure at each disk independently pressing said disks against the smooth surfaces of said sections, and means for withdrawing said disks wholly from said sections.

17. In a machine for slitting traveling fabrics, a rotary cutter-roll comprising a shaft having thereon a series of smooth surfaced cylindrical hardened metal sections, a series of rotary cutter-disks for coöperation with the smooth surfaces of said sections, a series of independent bars carrying at one end said disks, independent springs acting against the other ends of said bars, a support for said bars, and means for enabling the raising and lowering of said support and bars.

18. The combination of a cutter roll, a supporting rail having a rounded crown, bars resting on the crown of the supporting rail so as to be capable of a pivoting movement thereon, cutting disks journaled in the bars for coöperation with the cutter roll, a spacing member slidingly adjustable on the supporting rail, the said spacing member having pockets therein to receive the individual bars and the pockets having guiding walls upstanding from the top of the supporting rail to engage and guide the sides of the bars.

19. In a machine for slitting traveling fabrics, a rotary cutter-roll comprising a shaft having thereon a series of smooth surfaced cylindrical hardened metal sections, a series of rotary cutter-disks for coöperation with the smooth surfaces of said sections, a series of independent bars carrying at one end said disks, independent springs acting against the other ends of said bars, a support for said bars, an eccentric shaft upon which said support is sustained, and means for rotating said shaft to raise and lower said support and bars.

20. In a machine for slitting traveling fabrics, a rotary cutter-roll comprising a shaft having thereon a series of smooth surfaced cylindrical hardened metal sections, a series of rotary cutter-disks for coöperation with the smooth surfaces of said sections, a series of independent bars carrying at one end said disks, independent springs acting against the other ends of said bars, a support for said bars, and means for enabling the raising and lowering of said support and bars, said springs being of bar character and fastened at one end to said bars, while at their other ends they are flexed against a transverse bar of the machine, and said machine being provided with guides for said transverse bar enabling the same to be moved from engagement with said springs.

21. In a machine for slitting fabrics, a cutter-roll, a roller parallel therewith, a vertically movable mandrel in a plane between said roll and roller to receive the cut strips and wind them into rolls resting on said cutter-roll, means coöperating with said cutter-roll and said roller for rotating and thereby winding said strip-rolls, and a series of independently mounted cutter-disks coöperating with said cutter-roll for slitting the fabric into strips, said cutter-roll being composed of a shaft and a series of smooth-surfaced hardened metal cylindrical sections against which said disks act.

22. In a machine for slitting fabrics, a cutter-roll, a roller parallel therewith, a vertically movable mandrel in a plane between said roll and roller to receive the cut-strips and wind them into rolls resting on said cutter-roll and said roller, means coöperating with said cutter-roll and said roller for rotating and thereby winding said strip-rolls, and a series of independently mounted cutter-disks coöperating with said cutter-roll for slitting the fabric into strips, said cutter-roll being composed of a shaft and a series of smooth-surfaced hardened metal cylindrical sections against which said disks act, combined with means for independently adjusting the pressure of said disks against said cutter-roll.

23. Mechanism for slitting a web of material into strips comprising in combination, cutting disks, and a cutter roll with which the disks coöperate, said cutter roll consisting of a core shaft and a plurality of tubular surface sections mounted thereon, said surface sections presenting a smooth exterior cutting surface harder than the cutting disks to prevent the disks from cutting into the surface of the cutter roll, and means for supporting the disks in operative relation to the cutter roll.

24. In combination, a cutter roll, cutters coöperating therewith to sever a web of material into strips, a feed roll rotating in the same direction with the cutter roll and forming in connection therewith rewinding means to engage and wind the cut strips into coils, a roll for deflecting the cut strips away from the cutter roll, fingers arranged to engage between the cut edges of the strips at a point where the strips are deflected away from the cutter roll, a support on which the fingers are adjustable to suit different widths of strips, and a mounting for said support permitting the support to be shifted to carry the fingers to an inoperative position.

25. In combination, a cutter roll, cutters coöperating therewith to sever a web of material into strips, a feed roll rotating in the same direction with the cutter roll and at a slightly higher speed and forming in connection therewith rewinding means to engage and wind the cut strips into coils, a roll for deflecting the cut strips away from the cutter roll, fingers arranged to engage between the cut edges of the strips at a point where the strips are deflected away from the cutter roll, a support on which the fingers are adjustable to suit different widths of strips, and a mounting for said support permitting the support to be shifted to carry the fingers to an inoperative position.

26. In combination, a cutter roll, cutters coöperating therewith to sever a web of material into strips, a feed roll rotating in the same direction with the cutter roll and forming in connection therewith rewinding means to engage and wind the cut strips into coils, a roll for deflecting the cut strips away from the cutter roll, a removable mounting for the guide roll permitting the same to be readily removed from the machine, and fingers interposed between the cut edges of the strips at a point where the strips are deflected by the roll away from the cutter roll.

27. The combination with a plurality of cutters, of a cutter roll with which said cutters engage, said cutter roll embodying a core shaft and a series of tubular surface sections engaged thereon, said tubular surface sections being of harder material than the cutters to prevent said cutters from cutting into the same, and means for shifting the said tubular surface sections longitudinally on the core shaft to carry the joints between the sections out of line with respect to the cutters.

28. A slitting and rewinding machine, comprising: cutting disks coöperating with a smooth faced cutter roll, said roll having a surface of such hardness that it will not be cut into by the cutting disks, whereby the roll will always present a true smooth surface, said roll and disks acting to cut a web into strips without distorting the strips out of the plane of severance or laterally with respect to each other, and means for rewinding the cut strips into coils of uniform diameter, exerting a uniform pull on the surface of all the individual coils to produce an equal pull on the web at all points laterally thereof at the plane of severance.

29. In a machine for slitting fabrics, a cutter-roll, a roller parallel therewith, a vertically movable mandrel in a plane between said roll and roller to receive the cut-strips and wind them into rolls resting on said cutter-roll and said roller, means coöperating with said cutter-roll and said roller for rotating and thereby winding said strip-rolls, and a series of cutter-disks coöperating with said cutter-roll for slitting the fabric into strips, said cutter-roll being composed of a shaft and a series of smooth-surfaced hardened metal cylindrical sections against which said disks act.

Signed at borough of Brooklyn in the county of Kings and State of New York, this 6th day of Jany. A. D. 1912.

JAMES A. CAMERON.
GUSTAF BIRGER BIRCH.

Witnesses:
  EDWIN S. KNUDSON,
  FRED W. MEYER.